United States Patent [19]

Geschwender

[11] 4,421,485
[45] Dec. 20, 1983

[54] MODEL FLIGHT SIMULATOR

[76] Inventor: Mark J. Geschwender, 1550 S. 51st St., Lincoln, Nebr. 68506

[21] Appl. No.: 240,188

[22] Filed: Mar. 3, 1981

[51] Int. Cl.³ .................. G09B 9/08; A63H 27/04
[52] U.S. Cl. .................. 434/32; 46/1 H; 272/1 C
[58] Field of Search .......... 434/32; 46/1 B, 1 H; 272/1 C, 31 A, 31 B

[56] References Cited

U.S. PATENT DOCUMENTS

| | | | |
|---|---|---|---|
| 1,973,592 | 9/1934 | Weisinger | 434/32 |
| 2,409,238 | 10/1946 | Barber | 434/32 |
| 2,428,706 | 10/1947 | Hardell | 434/32 |
| 3,691,669 | 9/1972 | Folson et al. | 434/32 X |
| 4,265,047 | 5/1981 | Meyer et al. | 46/1 B X |
| 4,269,596 | 5/1981 | D'Andrade | 434/32 |

Primary Examiner—William H. Grieb
Attorney, Agent, or Firm—Vincent L. Carney

[57] ABSTRACT

To control a model aircraft or spacecraft with a control stick, the first and second sides of a parallelogram linkage within the console housing are attached to and form universal joints for the bottoms of a control column and control stick respectively, both of which extend out of the console housing, with the craft being mounted to the control column. Both the control stick and the control column are mounted by universal joints to the console so that movement of the control stick causes swiveling and tilting motion of the craft in both forward and side to side directions and any position in between about the universal joint under the control of the parallelogram linkage which connects the bottom ends of the control stick and control column.

11 Claims, 6 Drawing Figures

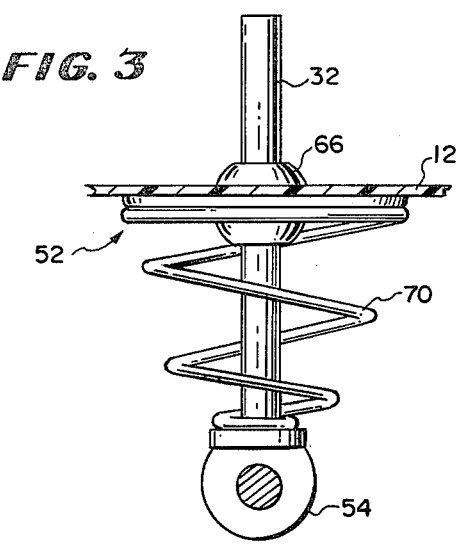
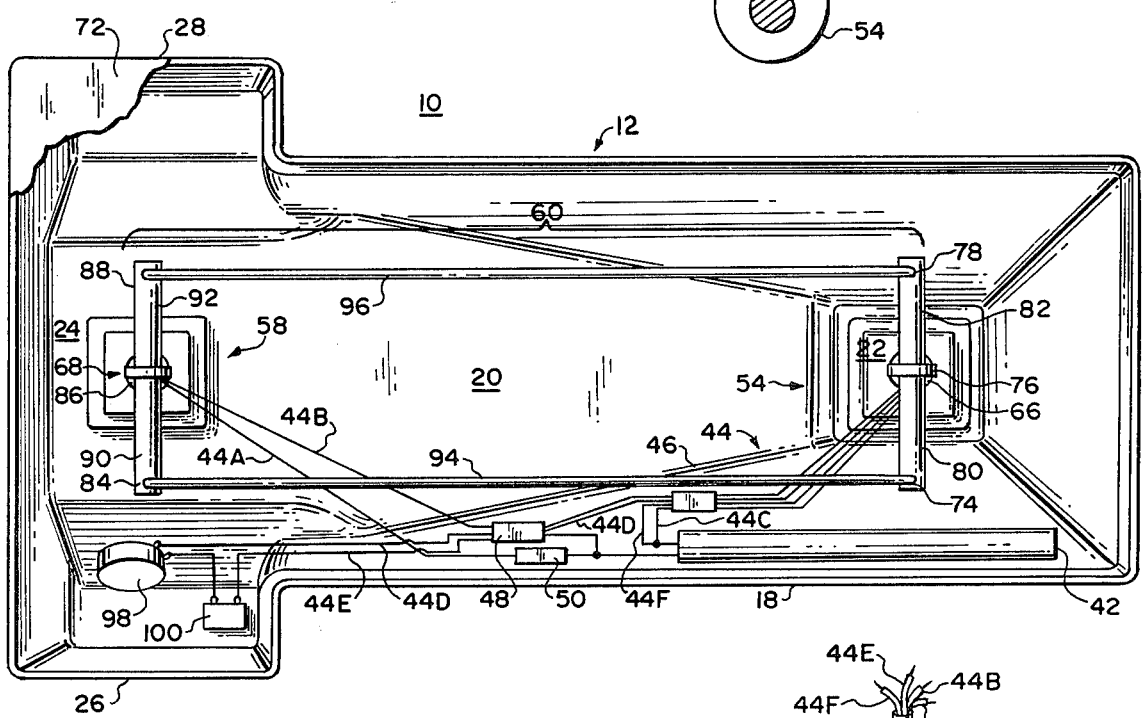
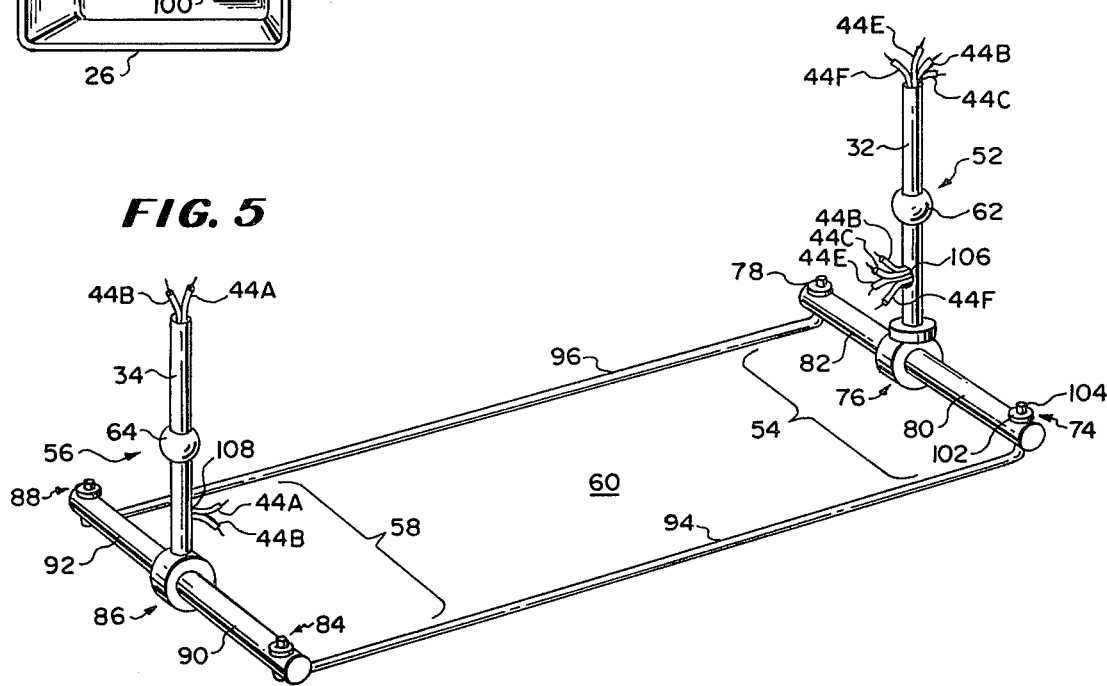

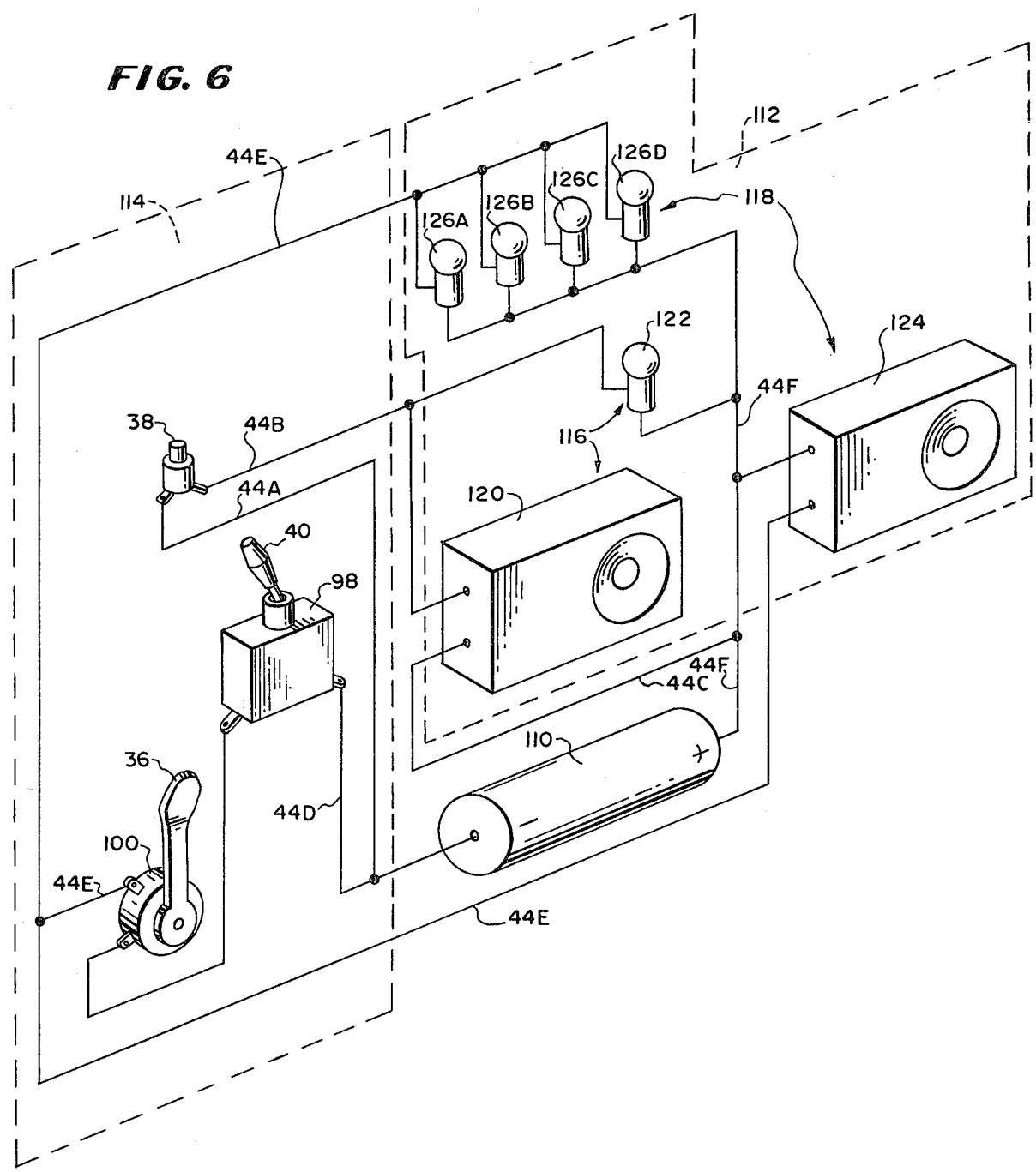

MODEL FLIGHT SIMULATOR

BACKGROUND OF THE INVENTION

This invention relates to model aircraft or model spacecraft flight simulators.

In one class of model aircraft simulator, a console housing is provided with an aircraft mounted on one end to a column and a stick type control at the other end to alter the attitude of the aircraft by manipulating the stick. Electrical connections are also made through the inside of the console housing to the aircraft and to manually-manipulatable controls near the control stick. The bottom of the control stick and the bottom of the mounting column for the aircraft are connected together by a linkage.

In a prior art model aircraft flight simulator of this class, the linkage connecting the bottom of the control stick to the control column includes a linkage which slides about a fixed point to connect the control stick and the control column for changes in attitude of the aircraft. This slide also pivots about the fixed point when the control stick is pushed from side to side to permit the aircraft to pivot either backward and forward or from side to side about its mounting column.

The prior art model aircraft flight simulator has several disadvantages such as: (1) it only permits motion in two directions; (2) it does not permit swiveling (yaw) of the model about its mounting column; (3) it is complicated and expensive; and (4) it is subject to binding.

SUMMARY OF THE INVENTION

Accordingly, it is an object of the invention to provide an improved model flight simulator.

It is a further object of the invention to provide a model flight simulator in which the model is capable of being moved in three directions.

It is a still further object of the invention to provide a model flight simulator in which the model is capable of being moved about any or all of three axes of motion simultaneously or separately.

It is a still further object of the invention to provide a simple and inexpensive model flight simulator.

It is a still further object of the invention to provide a linkage connecting a control stick to a control column for a model mounted to the column which is relatively free of binding and able to move the column about a pivot point in any direction perpendicular to the pivot point or to rotate it about the pivot point or orbit it.

It is a still further object of the invention to provide a novel mounting mechanism for a model which permits its control in position from a remote location.

In accordance with the above and further objects of the invention, a control stick and a mounting column are each mounted to a console housing by different universal joints and connected at their bottom ends by a linkage. The connection to the linkage is through universal joints which permit motion in any direction about the pivot points so that a model mounted on the other end of the control column moves in the same direction as the control stick, either forward and backward or from side to side, pivoting about the pivot point. In addition, rotation of the control stick causes rotation of the mounting column about its pivot point, thus causing yaw of the model.

Advantageously, the linkage is a parallelogram linkage which reduces binding while causing the control column to follow the control stick. The opposite sides of the parallelogram linkage are universal joints, one being connected to the control column and the other to the control stick. This is accomplished by mounting the control column and the control stick to opposite ends of the parallelogram through corresponding bearings in which the opposite sides are journaled. The two other sides of the parallelogram linkage are journaled for motion in the opposite direction to the ends carrying the control stick and control column.

The parallelogram linkage thus contains two parallel tie rods as its side members, each extending between the control station and the model mounting station. The ends of the parallelogram linkage act as turn arms for the control stick and control column. Each end of the two tie rods is journaled to a turn arm which is connected either: (1) to the end of the control stick through another bearing that permits rotation of the turn arm; or (2) to an arm which is journaled to the end of the control column through a bearing which permits rotation of the turn arm.

The two tie rods are journaled for pivoting motion in the plane of the parallelogram linkage so that when the control stick is rotated one of the tie rods moves in the direction of the control column and the other away from the control column to turn the shaft, causing a corresponding rotation of the control column. Similarly, pivoting of the control stick in any direction causes the parallelogram to rigidly push or pull the end of the control column to cause a similar pivoting.

The essentials of the linkage are two turn arms, one tie rod and one other member to provide rigidity. While a parallelogram with the control stick and control column connected to their centers is simple and symmetrical, the turn arms may be on only one side of the stick and column and may be angular instead. Moreover, the tie rod only needs to connect the turn arm at offset locations from the stick and column to provide turning torque.

Electrical connections may be made through the column where desired or to other locations within a console housing. The control stick and the control column may be of different sizes and mounted in different elevations without binding.

From the above description, it can be understood that the model aircraft flight simulator of this invention has several advantages such as: (1) it is simple in construction and economical; (2) the control column is made to follow the control stick in motion; (3) it is able to impart motion in any of three directions simultaneously or separately; (4) it is able to impart motion with respect to any of three axes of motion including pivoting in any direction and swiveling; (5) it is attractive in appearance; and (6) it is relatively free of binding and has ease of motion.

The above noted and other features of this invention will be better understood from the following detailed description when considered in connection with the accompanying drawings in which:

SUMMARY OF THE DRAWINGS

FIG. 3 is an enlarged fragmentary elevational view of a portion of the embodiment of FIG. 2;

FIG. 4 is a bottom view of the embodiment of FIG. 1;

FIG. 5 is a simplified, fragmentary perspective view of a portion of the embodiment of FIG. 1; and FIG. 6 is a schematic circuit diagram of a circuit which is incorporated in the embodiment of FIG. 1.

DETAILED DESCRIPTION

Figure 1:
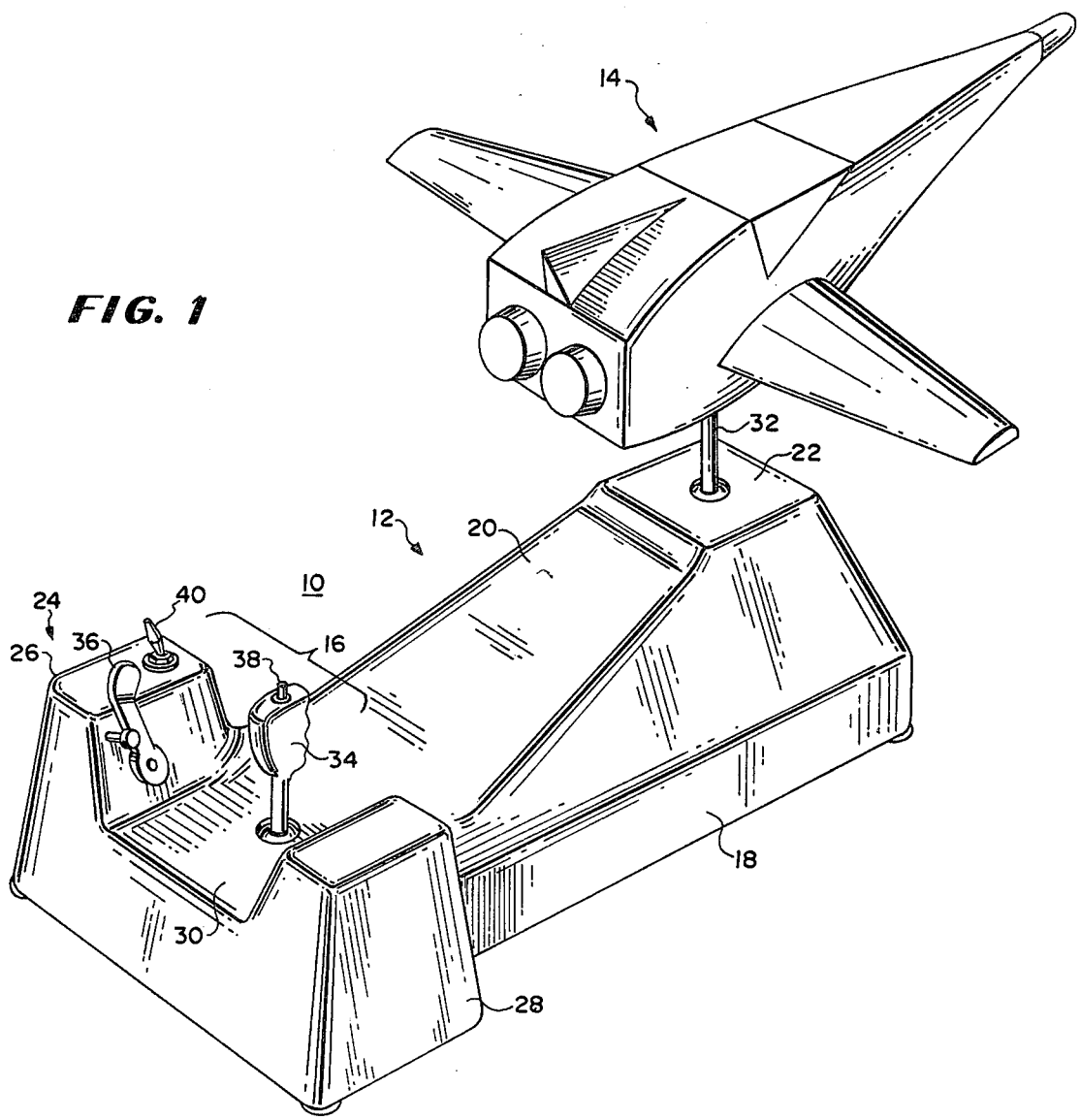
FIG. 1 is a perspective view of a model aircraft flight simulator in accordance with an embodiment of the invention.

In FIG. 1, there is shown a model aircraft flight simulator 10 having a console housing 12, a model 14 and a plurality of manually-manipulatable controls 16. The model 14 and the controls 16 are movably mounted to the console housing 12 at spaced apart points so that the user may, by manipulating the controls 16 manually, cause the model 14 to assume different positions in yaw, roll and pitch about a single axis.

The console housing 12 is shaped generally as a ramp having a base portion 18, a ramp portion 20, a model mounting portion 22, and a control section 24 with all of the sections being part of the integrally formed metal console housing 12.

The base portion 18 is shaped substantially as a right regular parallelopiped and has the flat bottom surface for resting on a table or a floor or the like when the model aircraft flight simulator 10 is in use. Its vertical longitudinal section is rectangular and its horizontal section is a right regular rectangle to the control section 24 at which place it has outwardly extending ears. Similarly the vertical cross sections form a right regular rectangle of one size under the ramp and model mounting portions 20 and 22 and a right regular rectangle which is larger in the direction perpendicular to the longitudinal axis of the model aircraft flight simulator 10 at the control section 24.

The ramp portion 20, the model mounting portion 22 and the control section 24 rest on top of the base portion 18, with the ramp portion 20 rising upwardly from the control section 24 to the top of the model mounting portion 22.

The model mounting portion 22 includes a flat horizontal top to which the model 14 is mounted and sides which slope up to the top from the base portion 18 so that the horizontal top of the model mounting portion 22 is above the control section 24 and is at the highest elevation of the console housing 12.

The control section 24 is lower than the model mounting portion 22 and includes two upwardly-extending substantially-rectangular portions 26 and 28 and a lower portion 30, with the lower portion 30 being centered and opening forwardly from the end of the model aircraft flight simulator 10. A direct line of sight through the lower portion 30 faces the ramp portion 20 and the model 14 on the opposite side of the console housing 12 to form an aesthetically pleasing viewing point looking between the upwardly-extending portions 26 and 28, upwardly on the ramp portion 20 and finally to the model 14 at the highest point on the model aircraft flight simulator 10. This configuration also provides adequate space within the model aircraft flight simulator 10 for the moving apparatus and the light and sound effects to be described hereinafter and hides them from direct view conveniently.

Although a hollow metal generally-rectangular housing is shown in FIG. 1 as part of the preferred embodiment, many other types of model housings could be used. For example, a plastic housing could be used and there are many other designs that would provide an aesthetically pleasing appearance when the model 14 is viewed from the control section 24 while permitting the controls and mechanisms to be hidden from view.

In the preferred embodiment, the model 14 is an aircraft or spacecraft having its underside mounted to an upwardly-extending control column 32, which is rigidly fastened to the bottom of the model 14 and extends through the top horizontal surface of the model mounting portion 22 to which it is movably mounted by a universal ball joint so as to permit controlled changes in the yaw, roll and pitch of the model 14.

While in the preferred embodiment, an aircraft or spacecraft is the model, other models may be used. The general criteria is that it should be desirable to manipulate the model by means of a remote control about three perpendicular axes to provide articulation representing yaw, roll and pitch.

The control section 24 has mounted on it certain controls 16, which in the preferred embodiment are a control stick 34, a throttle 36, an arming button 38 and an on/off lever 40. The throttle 36, control stick 34 and on/off lever 40 extend upwardly from the control section 24 and the arming button 38 extends upwardly from the control stick 34.

The control stick 34 is movably mounted by a universal ball joint to the recessed lower portion 30 and extends through its top surface to a linkage below (not shown in FIG. 1) by which it controls the control column 32 which mounts the model 14. In the preferred embodiment, the model 14 corresponds in motion to the motion of the control stick 34.

The other controls have been arbitrarily selected for appeal. For example, the throttle 36 controls lamps, a motor-driven propeller, a sound mechanism or the like to indicate speed of the model 14. The on/off lever 40 is utilized to prevent battery drain by opening the circuit with the battery and the arming button 38, while shown mounted on the control stick 34, may of course be mounted elsewhere and is in the preferred embodiment a push-button switch.

While a specific set of controls 16 is shown in FIG. 1, other controls may be utilized instead. Many different sound effects and lighting effects may be used as alternatives or be added to those in the preferred embodiment although the control stick 34 is designed to have special advantages to be described hereinafter in that its motion controls the model 14 in a particularly advantageous manner through a special linkage.

Figure 2:
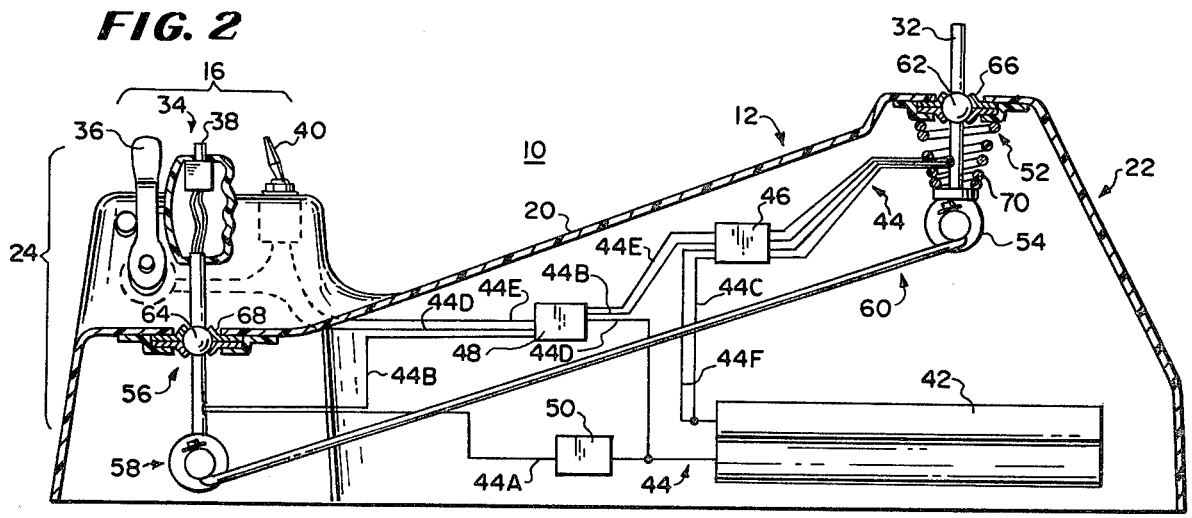
FIG. 2 is a sectional, fragmentary, transverse elevational view of the embodiment of FIG. 1.

In FIG. 2, there is shown in a longitudinal, fragmentary, elevational view the electrical system and the mechanical linkage system which extend between the model mounting section 22 and the control section 24 within the console housing 12, where they are not seen but nonetheless control the operation of the model 14 in response to manual manipulation of the controls 16.

The electrical system includes a battery holder 42, the control column 32, the manually-manipulatable controls 16 and a plurality of conductors 44 extending therebetween. The battery holder 42 is adapted to receive any standard dry cell batteries for operating the lights and motor or the like shown in the model 14. It may be mounted by means of screws or the like against the wall.

To permit sound and illumination in response to the depressing of the push-button switch 38, a conductor 44A is connected from a battery (not shown in FIG. 2) within the battery holder 42 at its negative terminal, supported by the adhesive patch 50 and connected to one of the terminals of the normally-open push-button switch 38. A conductor 44B is connected at one end to the other terminal of the push-button switch 38, supported by adhesive patches 48 and 46 and connected through a stem 38 with lights and sound devices (not shown in FIG. 2) within the model 14 (FIG. 1). With this arrangement the circuit which includes the battery, the push-button switch 38 and the lamps and noise makers is normally open but when the push-button switch 38 is depressed, the lamps and noise makers within the model 14 are actuated.

To provide for energization of other lamps and noise makers in response to movement of the throttle 36, a conductor 44D: (1) is connected at one end to the negative terminal of the battery (not shown in FIG. 2) within the battery holder 42; (2) is supported along its length by the adhesive patch 48; and (3) is connected at its other end in circuit with a toggle switch (not shown in FIG. 2) controlled by the on/off lever 40 and with a potentiometer (not shown in FIG. 2) that is controlled by the throttle 36. A conductor 44E, connected to the other terminal of the potentiometer, is supported by the adhesive patches 48 and 46 and extends through the control column 32 to lamps and noise makers (not shown in FIG. 2) within the model 14 (FIG. 1). A return conductor 44F passes through the control column 32 and is supported by the adhesive patch 46 from which it returns to the positive terminal of the battery (not shown in FIG. 2) within the battery holder 42.

Although the electrical system interconnects specific controls in the control section 16 through the control column 32, other arrangements are obviously possible. Some of the sound mechanisms could, for example, be mounted within the console housing 12 and provide an illusion of sound coming from the model 14 (FIG. 1). Moreover, different sound effects may be used, particularly with different models. For example, if a propeller airplane were to be used, electrical connections could be to a motor to spin the propeller.

In FIG. 2, there is also shown one view of linkage 60 interconnecting the control stick 34 with the control column 32. This linkage 60 includes four universal joints 52, 54, 56 and 58 which enable the linkage 60 to impart three directions of motion to the control column 32 about universal joint 52 in response to three directions of motion of the control stick 34, the three directions of motion being pitch, roll and yaw (angle in the forward directions, rolling to the side and swiveling about a vertical axis).

The universal ball joints 52 and 56 mount the control column 32 and control stick 34 respectively to the top surface of the console housing 12 while permitting motion in any of three directions. The universal joint 54 mounts one end of the linkage 60 to the control column 32 and the universal joint 58 mounts the other end of the linkage 60 to the control stick 34.

With this arrangement, pivot points are provided for both the control column 32 and the control stick 34, which points permit motion about a point that is fixed in position with respect to the console housing 12. The linkage 60 is permitted three directions of motion with respect to the control column 32 and the control stick 34 to impart individually or at the same time the three directions of motion about three perpendicular axes passing through the universal joint 52 corresponding to the directions of motion passing through the universal joint 56 of the control stick 34 to control three directions of motion of the model 14.

To provide universal motion of the control column 52 and of the control stick 34, the universal joint 52 includes a ball 62 mounted fixedly on the control column 32 within the joint 52 and the universal joint 56 includes a similar ball 64 mounted fixedly on the shaft of the control stick 34.

To permit the three-directional motion with respect to the console housing 12, the universal joint 52 includes a ball socket seat 66 containing upper and lower halves enclosing the ball 62 both of which are rigidly fixed with respect to the console housing 12. Similarly, to permit three-directional motion of the control stick 34, the universal joint 56 includes a similar ball socket seat 68 formed in two halves and enclosing the ball 64, both halves being rigidly mounted to the console housing 12.

While a specific type of universal joint has been described, any universal joint of any construction will serve the required purpose of permitting motion about three axes with respect to the console housing 12. In the preferred embodiment, the console housing 12 itself serves to maintain constant the distance between the universal joints 52 and 56 but another member may be used instead and the universal joint may not be mounted directly to the outer wall of the console housing 12. It may be held in position by other members with the control column 32 and the control stick 34 having freedom of movement with respect to the console housing 12 through an opening in the console housing 12 covered by a membrane or the like.

In FIG. 3, there is shown in an enlarged fragmentary elevational view the universal joints 52 and 54 as mounted to the portion of the console housing 12 to support the control column 32. As shown in this view, a helical centering spring 70 is mounted between the universal joint 52 and the universal joint 54 to maintain the control column 32 normally centered in position.

While a helical spring 70 is shown to maintain centering of the control column 32, any other centering mechanism may be used which biases the control column 32 in a centered position. Many types of such units are known in the art and generally rely on one or more centering springs although not always a helical centering spring.

In FIG. 4, there is shown a bottom view of the model flight simulator 10 with a bottom cover 72 being broken away to show the mechanical linkage and electrical connections between the control section 24 and the model mounting section 22 in the inside of the console housing 12.

As best shown in FIG. 4, the universal joints 54 and 58 have substantially the same structure but are located at opposite ends of the three-direction linkage 60.

The universal joint 54 includes three pivot or bearing points 74, 76 and 78 separated by two turn arms 80 and 82, and the universal joint 58 includes the three bearing or pivot points 84, 86 and 88 separated by the two turn arms 90 and 92. In the preferred embodiment, the two turn arms 80 and 82 comprise a single plastic rod, and the two turn arms 90 and 92 include a single plastic rod, the two plastic rods being parallel to each other and mounted for rotation with respect to the control stick and control column at the bearing points 76 and 86 respectively.

The bearing points 76 and 86 each include a different cylindrical bearing mounted to the end of the control column 32 and control stick 34 respectively. Internal cylindrical bearing surfaces are provided at the center point of the rods forming the turn arms to rotatably receive the rods and thus form the turn arms 80, 82, 90 and 92 on opposite sides of the bearing points at 76 and 86. This arrangement provides a corresponding axis of rotation perpendicular for each of the control column 32 (FIGS. 1 and 2) and control stick 34 (FIGS. 1 and 2).

The pivot points 74 and 78 are at the outer ends of the arms 80 and 82 and make a pivotal connection in the linkage 60 at those points to permit pivoting in a plane perpendicular to the control column 32 (FIGS. 1 and 3) thus completing the universal joint 54 and the pivot points 84 and 88 are at the outer ends of arms 90 and 92 and make pivotal connection with the linkage 60 to permit the rotation at a plane perpendicular to the control stick 34 (FIGS. 1 and 3) to complete the universal joint 58.

The linkage 60 includes first and second tie rods 94 and 96 respectively with the tie rod 94 being pivotally connected at one of its ends to the turn arm 80 at 74 and at its other end to the turn arm 90 at 84 and with the tie rod 96 being pivotally connected at one of its ends to the turn arm 82 at 78 and at its other end to the turn arm 92 at 88. With these connections, the tie rods 94 and 96 together with the turn arms 80, 82, 90 and 92 form a parallelogram linkage the opposite ends of which are part of the universal joints 54 and 58 at the bottoms of the control column 32 (FIG. 1) and the control stick 34 (FIG. 1).

While a parallelogram linkage is used in the preferred embodiment, other types of linkages may be used instead with similar results. The linkages must be capable of imparting force in a generally horizontal plane between the bottom end of the control stick (FIG. 1) and the pivoted end of the control column 32 (FIG. 1), in either a back and forth direction, a side to side direction, or a swiveling or rotating direction along the longitudinal axes. For this purpose: (1) at least one member of the linkage must be offset from the longitudinal axes of the control shaft 34 and one from control stick 32; (2) certain of the individual members of the linkage must be able to move with respect to each other; (3) certain members must be capable of being connected through a universal joint to the control stick and control column to permit movement in three directions; and (4) the linkage must be able to impart force in each of those directions.

The electrical connections between the control section 24 and the model mounting portion 22 includes the battery holder 42, the conductors 44, the adhesive patches 46, 48 and 50, an on-off switch 98 which is actuated by the on-off lever 40 (FIG. 1) and a potentiometer 100 which is controlled by the throttle 36 (FIG. 1).

As shown in this figure, the conductor 44D is connected to one terminal of the on-off switch 98, the other terminal of which is connected to a first terminal of the potentiometer 100 is connected to the conductor 44E so that the on-off switch 98 controls the circuit to prevent battery drainage when the circuit is opened. When the circuit is closed by switch 98, the current is controlled by the resistance of the potentiometer 100 as set by the throttle 36 (FIG. 1).

In FIG. 5, there is shown a simplified fragmentary perspective view of the linkage 60 between the control column 32 and the control stick 34 illustrating the manner in which its four universal joints 52, 54, 56 and 58 provide three directions of movement of linkage 60.

As best shown in this figure, the two tie rods 94 and 96 are each pivotally connected at their opposite ends to a different one of the four turn arms 80, 82, 90 and 92. A typical connection is shown at 74 which is identical to the other four connections. As shown at 74, the upwardly turned end of the tie rod 94 passes through an opening in the distal end of the turn arm 80 in a direction perpendicular to the longitudinal axes of the turn arm 80 and is connected by a cap or by a retaining ring 102. The retaining ring 102 is forced into a groove in the end of the tie rod 94 between its end 104 and protrudes through the opening therein. All four of the pivot points 74, 78, 84 and 88 are formed in the same manner.

The tie rod 94 and 96 in the preferred embodiment are rigid wires bent upwardly at the ends and the turn arms 80, 82, 90 and 92 are plastic so as to form naturally lubricated surfaces for rubbing against each other, but other materials can, of course, be used.

To provide electrical connections to the model 14 (FIG. 1) through a single connecting control column 32, the electrical wires 44B, 44C, 44E and 44F pass through an aperture 106 located close to the universal joint 52 and between that joint and the universal joint 54. They pass upwardly through the column 32 through the ball 62 of the universal joint 52, out its open end and into the model 14 (FIG. 1). Similarly, the connecting wires to the arming push button switch 38 (FIG. 1) pass through an aperture 108 in the control stick 34 between the universal joints 56 and 58 and adjacent to the ball 64 of the universal joint 56. These wires pass upwardly through the control stick 34 to the bottom in its upward end as shown at 38 in (FIG. 1).

With this arrangement, there is a minimum flexing of the wires since they enter the control column 32 and control stick 34 adjacent to the universal joint which is stationary with respect to the console housing 12. Moreover, they are hidden since they are beneath the console housing 12 and pass through it within the control column 32 and control stick 34.

In the preferred embodiment, the distances between the model 14 and the universal joint 52 is equal to the distance between the top of the control stick 34 and the universal joint 56 and the distance between the universal joint 52 and the universal joint 54 is equal to the distance between the universal joint 56 and the universal joint 58. With this arrangement, the control column 32 and the control stick 34 provide the same leverage ratios between their respective pivot points at the universal joints 52 and 56. Consequently, a motion in the forward or reverse direction or from side to side or at any angle in between made by the control stick 34 results in an identical motion in the same direction in the control column 32 and thus results in a corresponding pivotal motion of the model 14 (FIG. 1).

However, the ratios of the distances between the model 14, the top of the control stick 34, the universal joints 52, 54, 56 and 58 can be different than those in the preferred embodiment, and thus provide greater or less motion in the model 14 (FIG. 1) and provide a different velocity of motion and a different direction of motion. The arrangement in the preferred embodiment, however, has the advantages of closely resembling the actual control of an aircraft and providing extreme simplicity of construction and a reduction in cost over most other versions.

To change the amount of pitch or roll of the model with respect to the amount of motion of the control stick 34, the ratio of the distances between the two ends of the control column 32 and the control stick 34 about their pivoting universal joints 52 and 54 respectively is changed. For example, if the universal joint 52 remains centered about the control column 32 while the universal joint 56 is moved so that the distance above it is twice the distance below it, then the motion of the universal joint 58 is half of that of the top of the control stick 34 and thus the motion of the model transmitted from this point is half. Similarly, the universal joint 56 may be moved upwardly so as to proportionately cause a greater motion of the model with respect to motion of the top of the control stick 34 just as there was a proportionate reduction as the ratio of the two sides of the control stick 34 with respect to the universal joint 56 was changed by moving the universal joint 56 downwardly.

From the above description, it can be understood that the amount of motion of the model is in the same direction and inversely proportional to the ratio of the distances between the universal joint 56 and the top of the control stick 34 to the universal joint 56 and the universal joint 58. The motion is also directly proportional to the ratio of the distances between universal joint 52 and the model to the distance between the universal joint 52 and the universal joint 54.

To change the direction of motion so that a forward motion of the control stick 34 results in a backward motion of the top of the control column 32 away from the control stick 34 rather than toward the control stick 34 so as to elevate the nose of an aircraft facing away from the control stick 34 rather than lowering it, the pivotal universal joint 56 is located below the universal joint 58 so that the universal joint 58 is between the top of the control stick 34 and the joint 56. This is best accomplished by passing the control stick 34 through the top of the console housing through a membrane with an enlarged hole and mounting the universal joint 56 to a strut or member near the bottom of the console housing 12. A similar change may be made instead in the universal joints 52 and 54 with the same result.

The arrangement with universal joint 56 below the universal joint 58 is complex and causes the control stick or the control shaft to move within an aperture in the top of the console frame rather than pivoting at that point, thus disturbing the illusion provided by the simulator. Moreover, results in the nose of the aircraft or other model being pointed toward the operator instead of away from him which, in most cases, is not the desired effect.

To change the direction of rotation or the amount of rotation, the links 94 and 96 are changed in position. To change the direction of rotation the links must be crossed and to change the amount of rotation the arms 90 and 92 are caused to be a different length from the arms 80 and 82. Similarly, by making the arms 90 and 92 or the arms 80 and 82 with different ratios, the amount of rotation in one direction can be changed from that in the other direction. However, some of these embodiments lack the free and easy motion of the preferred embodiment.

The control stick 34 and the control column 32 do not have to be the same total length since it is the ratio that is important. Indeed, in the preferred embodiment, the control stick is larger than the control column for convenience and to increase the leverage effect, and thus, increase the ease of motion. In this manner, the lengths of the control stick and control column may be tailored for appearance, ease of use and freedom of motion.

During operation of the linkage by moving the control stick 34, the electrical system may be turned on and the throttle 36 (FIG. 1) adjusted for suitable noise. Also during operation, the arming push button switch 38 may be depressed for effects simulating the firing of weapons. Obviously, the electrical system is operated independently from the maneuvering and may be operated at any time.

For maneuvering, the operator grasps the control stick 34 and moves it in a manner similar to that of an actual aircraft or spacecraft for changing the attitude of the model. For example, the operator pulls back on the control stick, the pitch of the model, with its nose facing away from the operator as though the operator were in the cockpit, is raised in a climb and if the stick is pushed forward its pitch is changed so as to lower the nose.

Similarly, if the operator moves the stick to the left the model with its nose pointing away from him is pivoted to a roll position to the left and the same to the right and if the control stick is also twisted, the model yaws. Thus the model pivots identically about the universal joint 52 as the top of the stick. The operator may turn the model by rotating the stick and the nose of the model moves in the same direction.

The stick may be moved so as to orbit in a circle and the model will do the same or it may be moved in any direction and the model will follow the same motion by pivoting about the same point. Thus a motion of the stick creates both rolling and yaw or a change in pitch or a combination of any three.

As can be understood from this description, the mechanical mechanism of this invention has several advantages over the prior art such as: (1) it is simple and inexpensive in construction; (2) it is relatively easy to move and relatively free from binding; (3) it simulates the actual motion of an aircraft or spacecraft; (4) it can be tailored in size without difficulty and adjusted in the amounts of motion to accommodate different console frames; and (5) it is pleasant in appearance and permits electrical connections to be made without visibility in a single column contact to the unit.

As can be understood most clearly from FIG. 5, the linkage 60 cooperates with a linkage not shown thereon and provided by the console housing 12 to provide three fixed distance connections between the control column 32 and control stick 34. There are three points at which each are connected and there is a corresponding point on the other, the distance of which remains fixed. This is necessary for rigidity if three degrees of motion are to be provided.

For example, in the preferred embodiment of FIG. 5 there is a fixed connection between the universal joints 52 and 56 which is provided by the console housing 12 and forms a center of pivoting for the control stick 34 and the control column 32. A second point is provided between pivot points 74 and 84 by linkage 60 through tie rod 94. Even though that linkage may move with respect to the console housing 12, the two points 74 and 84 are held at the same distance by the tie rod 94 which is journaled to the turn arms 80 and 90. The third points are between the points 78 and 88 which are held together in a fixed distance by the tie rod 96 which is journaled to the turn arms 82 and 92. The three points of connection between the control stick 34 and the control column 32 prevent one from moving with respect to the other and cause one to follow the other.

In FIG. 6, there is shown a schematic circuit diagram of the electrical system of the preferred embodiment having a battery 110, a sound and light effect section shown generally within the box 112 and a control section shown generally within the box 114. The battery 110, the sound and light effects circuit 112 and the control circuit 114 are electrically connected by conductors so that an operator manipulating manual controls within the control circuit 114 can control sound and light effects in the model 14 (FIG. 1) through the sound and lighting circuit 112.

The battery 110 is mounted within the battery holder 42 (FIG. 2 and 4) which in turn is fastened to an inner wall within the console housing 12 (FIG. 1 and FIG. 4). It provides electrical power and is connected to the control circuit 114 and the sound and lighting effects circuit 112 by conductors.

The sound and light effect circuit 112 includes in the preferred embodiment an arming section 116 and a power plant section 118.

The arm section 116 includes a sound effect device 120 and a lamp 122 to provide illumination and a sound corresponding to the firing of weapons. The lamp 122 and sound effect device 120 are commercial devices easily purchased on the open market and energized by batteries. They are connected in parallel with the conductor 44B interconnecting one terminal of each to the push button switch 38 in the control circuit 114 and the conductor 44F connecting their other terminals to the positive terminal of the battery 110. The negative terminal of the battery 110 is connected to them through the normally open push button switch 38 by conductor 44A so that the depressing of the push button switch 38 causes sound to be emitted by the sound effects device 120 and the lamp 122 to be illuminated.

The power plant section 118 includes a sound effects device 124 and a bank of four lights 126A-126D. The sound effect device 124 and each of the lamps 126A-126D are connected in parallel with one terminal of each being electrically connected through conductor 44F to the positive terminal of the battery 110. In the preferred embodiment the other terminal of each of the lamps 126A-126D and the other terminal of the sound effects device 124 are all electrically connected to the conductor 44E. Conductor 44E is electrically connected in series through the potentiometer 100 and the on-off toggle switch 98 to the negative terminal of battery 110. With this arrangement, the toggle switch 98 and the potentiometer 100 are adjusted to create the power plant sound.

The control section 114 has the push-button switch 38, the toggle switch 98 and the potentiometer 100 all mounted for manual manipulation by the operator. As discussed above, the on-off toggle switch 98 is connected in series with the potentiometer 100, with a first terminal of the potentiometer 100 being electrically connected to conductor 44E, a second terminal of the potentiometer 100 being connected to a first terminal of the on-off toggle switch 98 and a second terminal of the on-off toggle switch 98 being electrically connected to the negative terminal of the battery 110.

With this arrangement the toggle 40 may be turned to its off position to open the on-off toggle switch 98 and thus prevent drainage on the battery. When the toggle switch 40 is turned on, the throttle lever 36 may be adjusted to change the volume of noise from the sound effect device 124 and the intensity of illumination from the lamps 126A-126D and thus alter the noise and illumination from the simulated model corresponding to a change in speed. The push button switch 38 is not connected to the toggle switch 98 since it is a normally-open on-off device and thus, avoids unnecessary drainage of the battery itself.

While a particular set of sound and lighting effects has been described, it is obvious that other circuits and devices could be used. Different noises can be provided or no sound whatsoever and different lighting effects or motion such as the turning of the propeller may be provided in a manner analogous to the disclosed circuit. Any of these different arrangements may cooperate with the convenient mounting mechanism for the model described herein.

From the above description it can be understood that the model flight simulator 10 of this invention has several advantages such as: (1) it is simple and inexpensive; (2) it provides realistic control of the motion of the model 14 and of the sound and lighting effects in a manner analogous to actual aircraft; (3) it is relatively free from binding; (4) it may be constructed to accommodate different amounts of motion of the control levers with ease; and (5) it is attractive in appearance.

Although a preferred embodiment of the invention has been described with some particularity, many modifications and variations in the preferred embodiment are possible without deviating from the above teachings. Therefore, it is to be understood that, within the scope of the appended claims, the invention may be practiced other than as specifically described.

What is claimed is:

1. Apparatus for movably mounting a model to simulate positions of a vehicle comprising:

a support column adapted to have said model mounted to it;

a control stick adapted to be manually manipulated by an operator;

housing means having at least one rigid mounting element;

means for mounting said control stick at a first control-stick mounting point on said control stick to a first location on said mounting element with freedom to pivot at said first control-stick mounting point in all directions and to rotate therein;

means for mounting said support column at a first support-column mounting point on said support column to a second location on said mounting element with freedom to pivot at said first support-column mounting point in all directions and to rotate therein, whereby said first control-stick mounting point and first support-column mounting point are held at a fixed distance while permitting rotation and pivoting of said control stick and support column;

linkage means, connected to said control stick at a second control-stick mounting point on said control stick and to said support column at a second support-column mounting point on said support column, for holding said second control-stick mounting point and said second support-column mounting point at a fixed distance from each other;

said linkage means including mounting means for mounting said second control-stick mounting point and second support-column mounting points with freedom to pivot in all directions and to rotate;

said model being of a vehicle, whereby said control stick controls the attitude of said vehicle;

said linkage means including first and second elongated rigid members movable with respect to each other;

said first elongated rigid member has first and second ends;

said first end being movable in first and second directions with respect to said second control-stick mounting point;
said second end being movable in first and second directions with respect to said second support-column mounting point;
said second elongated rigid member has first and second ends;
said first and second elongated rigid member being movably mounted in two directions with respect to said second control-stick mounting point;
said second end of said second elongated rigid member being movably mounted in two directions with respect to said second support-column mounting point;
said mounting means for mounting said second control-stick mounting point and second support-column mounting points includes first and second arms;
said first arm being mounted to said control stick at said second control stick mounting means at an angle to the longitudinal axis of said control stick;
said second arm being mounted to said support column at said second support-column mounting point at an angle to the longitudinal axis of said support column;
one of said first and second rigid elongated members being connected at one end to said one arm; and
one of said first and second rigid elongated members being connected to said second arm, whereby rotation of said control stick within said first control-stick mounting point causes rotation of said support column within said first support-column mounting point.

2. Apparatus according to claim 1 in which said first and second elongated rigid members are mounted parallel to each other.

3. Apparatus according to claim 2 in which said linkage means is a parallelogram linkage.

4. Apparatus according to claim 3 in which said means for mounting said control stick at a first control stick point with freedom to pivot in all directions and to rotate therein is a universal ball joint.

5. Apparatus according to claim 4 in which said means for said mounting said support column at a first support-column mounting point is a universal ball joint.

6. Apparatus for movably mounting a model to simulate positions of a vehicle comprising:
a support column adapted to have said model mounted to it;
a control stick adapted to be manually manipulated by an operator;
housing means having at least one rigid mounting element;
means for mounting said control stick at a first control-stick mounting point on said control stick to a first location on said mounting element with freedom to pivot at said first control-stick mounting point in all directions and to rotate therein;
means for mounting said support column at a first support-column mounting point on said support column to a second location on said mounting element with freedom to pivot at said first support-column mounting point in all directions and to rotate therein, whereby said first control-stick mounting point and first support-column mounting point are held at a fixed distance while permitting rotation and pivoting of said control stick and support column;
linkage means, connected to said control stick at a second control-stick mounting point on said control stick and to said support column at a second support-column mounting point on said support column, for holding said second control-stick mounting point and said second support-column mounting point at a fixed distance from each other;
said linkage means including mounting means for mounting said second control-stick mounting point and second support-column mounting points with freedom to pivot in all directions and to rotate;
said linkage means including first and second elongated rigid members movable with respect to each other;
said first elongated rigid member having first and second ends;
said first end being movable in first and second directions with respect to said second control-stick mounting point;
said second end being movable in first and second directions with respect to said second support-column mounting point;
said second elongated rigid member having first and second ends;
said first and second elongated rigid member being movably mounted in two directions with respect to said second control-stick mounting point;
said second end of said second elongated rigid member being movably mounted in two directions with respect to said second support-column mounting point;
said mounting means for mounting said second control-stick mounting point and second support-column mounting points including first and second arms;
said first arm being mounted to said control stick at said second control-stick mounting means at an angle to the longitudinal axis of said control stick;
said second arm being mounted to said support column at said second support-column mounting point at an angle to the longitudinal axis of said support column;
one of said first and second rigid elongated members being connected at one end to said one arm; and
one of said first and second rigid elongated members being connected to said second arm, whereby rotation, of said control stick within said first control-stick mounting point causes rotation of said support column within said first support-column mounting point.

7. Apparatus according to claim 6 in which said first and second elongated rigid members are mounted parallel to each other.

8. Apparatus according to claim 7 in which said linkage means is a parallelogram linkage.

9. Apparatus for movably mounting a model to simulate positions of a vehicle comprising:
a support column adapted to have said model mounted to it;
a control stick adapted to be manually manipulated by an operator;
housing means having at least one rigid mounting element;
means for mounting said control stick at a first control-stick mounting point on said control stick to a first location on said mounting element with freedom to pivot at said first control-stick mounting point in all directions and to rotate therein;

means for mounting said support column at a first support-column mounting point on said support column to a second location on said mounting element with freedom to pivot at said first support-column mounting point in all directions and to rotate therein, whereby said first control-stick mounting point and first support-column mounting point are held at a fixed distance while permitting rotation and pivoting of said control stick and support column;

linkage means, connected to said control stick at a second control-stick mounting point on said control stick and to said support column at a second support-column mounting point on said support column, for holding said second control-stick mounting point and said second support-column mounting point at a fixed distance from each other;

said linkage means including mounting means for mounting said second control-stick mounting point and second support-column mounting points with freedom to pivot in all directions and to rotate;

said linkage means including first and second elongated rigid members movable with respect to each other;

said mounting means for mounting said second control-stick mounting point and second support-column mounting points including first and second arms;

said first arm being mounted to said control stick at said second control-stick mounting means at an angle to the longitudinal axis of said control stick;

said second arm being mounted to said support column at said second support-column mounting point at an angle to the longitudinal axis of said support column;

one of said first and second rigid elongated members being connected at one end to said one arm; and one of said first and second rigid elongated members being connected to said second arm, whereby rotation of said control stick within said first control-stick mounting point causes rotation of said support column within said first support-column mounting point.

10. Apparatus according to claim 9 in which said first and second elongated rigid members are mounted parallel to each other.

11. Apparatus according to claim 10 in which said linkage means is a parallelogram linkage.

* * * * *